US012173379B2

(12) United States Patent
Kim et al.

(10) Patent No.: US 12,173,379 B2
(45) Date of Patent: *Dec. 24, 2024

(54) NON-ORIENTED ELECTRICAL STEEL SHEET AND MANUFACTURING METHOD THEREFORE

(71) Applicant: LG Electronics Inc., Seoul (KR)

(72) Inventors: Jin Bae Kim, Seoul (KR); Dongwon Kang, Seoul (KR); Joungwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 71 days.

This patent is subject to a terminal disclaimer.

(21) Appl. No.: 17/773,801

(22) PCT Filed: Sep. 29, 2020

(86) PCT No.: PCT/KR2020/013369

§ 371 (c)(1),
(2) Date: May 2, 2022

(87) PCT Pub. No.: WO2021/096064

PCT Pub. Date: May 20, 2021

(65) Prior Publication Data

US 2022/0396848 A1 Dec. 15, 2022

(30) Foreign Application Priority Data

Nov. 12, 2019 (KR) ........................ 10-2019-0144219
Nov. 12, 2019 (KR) ........................ 10-2019-0144220

(51) Int. Cl.
*C21D 9/46* (2006.01)
*C21D 6/00* (2006.01)
(Continued)

(52) U.S. Cl.
CPC ............... *C21D 9/46* (2013.01); *C21D 6/004* (2013.01); *C21D 6/005* (2013.01); *C21D 6/008* (2013.01); *C21D 8/005* (2013.01); *C21D 8/1222* (2013.01); *C21D 8/1233* (2013.01); *C21D 8/1272* (2013.01); *C22C 38/002* (2013.01); *C22C 38/02* (2013.01); *C22C 38/04* (2013.01); *C22C 38/06* (2013.01); *C22C 38/34* (2013.01); *C22C 38/42* (2013.01); *H01F 1/14775* (2013.01); *C22C 38/16* (2013.01); *C22C 38/18* (2013.01); *C22C 2202/02* (2013.01)

(58) Field of Classification Search
None
See application file for complete search history.

(56) References Cited

U.S. PATENT DOCUMENTS

2019/0017135 A1* 1/2019 Lee ....................... C22C 38/004

FOREIGN PATENT DOCUMENTS

CN 1078270 11/1993
CN 1827820 9/2006
(Continued)

*Primary Examiner* — Xiaobei Wang
(74) *Attorney, Agent, or Firm* — Fish & Richardson P.C.

(57) ABSTRACT

Disclosed are a non-oriented electrical steel sheet and a manufacturing method therefore, the sheet ensuring excellent magnetic characteristics by having increased texture intensity of surface (100) through strict control of the content ratio of Si, Al and the like and through final annealing heat treatment in an inert gas atmosphere.

19 Claims, 5 Drawing Sheets

(51) Int. Cl.

| | |
|---|---|
| ***C21D 8/00*** | (2006.01) |
| ***C21D 8/12*** | (2006.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***C22C 38/16*** | (2006.01) |
| ***C22C 38/18*** | (2006.01) |
| ***C22C 38/34*** | (2006.01) |
| ***C22C 38/42*** | (2006.01) |
| ***H01F 1/147*** | (2006.01) |

(56) References Cited

FOREIGN PATENT DOCUMENTS

| | | | | |
|---|---|---|---|---|
| CN | 104781435 | | | 7/2015 |
| CN | 105849300 | | | 8/2016 |
| CN | 108463569 | | | 8/2018 |
| CN | 108486453 | | | 9/2018 |
| JP | 2001152300 | | | 6/2001 |
| JP | 2003253404 | | | 9/2003 |
| JP | 2006070356 | A | * | 3/2006 |
| JP | 2008031499 | A | * | 2/2008 |
| JP | 2009299102 | A | * | 12/2009 |
| JP | 2013194316 | | | 9/2013 |
| KR | 940009347 | | | 5/1994 |
| KR | 20010030210 | | | 4/2001 |
| KR | 20060133074 | | | 12/2006 |
| KR | 20100076518 | | | 7/2010 |
| KR | 10-2014-0058934 | | * | 5/2014 |
| KR | 20150073787 | | | 7/2015 |
| KR | 20160073222 | | | 6/2016 |
| KR | 101877198 | | | 7/2018 |

* cited by examiner

NON-ORIENTED ELECTRICAL STEEL SHEET AND MANUFACTURING METHOD THEREFORE

CROSS-REFERENCE TO RELATED APPLICATIONS

This application is a National Stage application under 35 U.S.C. § 371 of International Application No. PCT/KR2020/013369, filed on Sep. 29, 2020, which claims the benefit of Korean Patent Application No. 10-2019-0144219, filed on Nov. 12, 2019, and Korean Patent Application No. 10-2019-0144220, filed on Nov. 12, 2019. The disclosures of the prior applications are incorporated by reference in their entirety.

TECHNICAL FIELD

The present invention relates to a non-oriented electrical steel sheet and a manufacturing method therefore.

BACKGROUND ART

Electrical steel sheets can be classified into oriented electrical steel sheets and non-oriented electrical steel sheets according to magnetic characteristics.

Since an oriented electrical steel sheet is manufactured to be easily magnetized in a rolling direction of the steel sheet and has particularly excellent magnetic characteristics in the rolling direction. Therefore, the oriented electrical steel sheet is mainly used as an iron core for large transformer and small-sized and medium-sized transformers that require low iron loss and high permeability.

On the other hand, a non-oriented electrical steel sheet has uniform magnetic characteristics regardless of the orientation of the steel sheet. Accordingly, the non-oriented electrical steel sheet is mainly used as the iron cores of linear compressor motors, air conditioner compressor motors, and high-speed motors for vacuum cleaners.

Recently, with the trend of increasing efficiency and miniaturization of electrical equipment in terms of energy saving, research is being conducted to reduce the iron loss as much as possible in the non-oriented electrical steel sheet.

In this way, in order to reduce the iron loss in the non-oriented electrical steel sheet, research is in progress to increase electrical resistance of the electrical steel sheet by increasing the content ratio of Si, Al, and the like, but when the content ratio of Si, Al, and the like is increased, there are the following problems.

First, when the content ratio of Si, Al, and the like increases in the non-oriented electrical steel sheet, the magnetic flux density decreases, and the torque of a motor decreases or copper loss increases.

Second, when the content ratio of Si exceeds 3.5 wt % in the non-oriented electrical steel sheet, cracks may occur during cold rolling due to increased brittleness.

Third, when the non-oriented electrical steel sheet has a high reduction ratio of 60% or more in a cold rolling process, the texture of a 111 surface is strongly developed, thus the fraction of the texture of a 100 surface with excellent magnetic characteristics decreases, and the magnetic characteristics thereof are degraded.

CITATION LIST

Patent Documents

Patent Document 1: Korean Unexamined Patent Application, First Publication No. 10-2016-0073222 (published on Jun. 24, 2016)

Patent Document 1: Korean Unexamined Patent Application, First Publication No. 10-1994-0009347 (published on May 20, 1994)

Technical Problem

An object of the present invention is to provide a non-oriented electrical steel sheet having improved magnetic characteristics by improving the texture of a 100 surface having excellent magnetic characteristics, and a manufacturing method therefore.

Also, another object of the present invention is to provide a non-oriented electrical steel sheet having an iron loss of 2.3 W/kg or less and a magnetic flux density of 1.79 to 1.90 T, and a manufacturing method therefore.

Also, yet another object of the present invention is to provide a non-oriented electrical steel sheet suitable for use as an iron core for linear compressor motors, air conditioner compressor motors, and high-speed motors for vacuum cleaners by improving the texture of a 100 surface having excellent magnetic characteristics to ensure excellent magnetic characteristics, and a manufacturing method therefore.

Further, still another object of the present invention is to provide a non-oriented electrical steel sheet having excellent magnetic characteristics by suppressing formation of the texture of a 111 surface and increasing strength of the texture of a 100 surface through control of a reduction ratio in a cold rolling process, and a manufacturing method therefore.

Further, still another object of the present invention is to provide a non-oriented electrical steel sheet having excellent magnetic characteristics by increasing strength of the texture of a 100 surface through strict control of a content ratio of Si, Al and the like, control of a reduction ratio in a cold rolling process, and performing a final annealing heat treatment in an inert gas atmosphere, and a manufacturing method therefore.

Further, still another object of the present invention is to provide a non-oriented electrical steel sheet suitable for use as an iron core for linear compressor motors, air conditioner compressor motors, and high-speed motors for vacuum cleaners by improving the texture of a 100 surface with excellent magnetic characteristics to ensure excellent magnetic characteristics, and a manufacturing method therefore.

The objects of the present invention are not limited to the above-described objects, and other objects and advantages of the present invention that are not described may be understood by the following description, and will be more clearly understood by examples of the present invention. Further, it will be readily apparent that the objects and advantages of the present invention may be realized by means and combinations thereof indicated in the claims.

Technical Solution

A non-oriented electrical steel sheet and a manufacturing method therefore according to a first embodiment of the present invention ensured excellent magnetic characteristics by improving texture of a 100 surface having excellent magnetic characteristics.

In addition, the non-oriented electrical steel sheet and the manufacturing method therefore according to the first embodiment of the present invention can exhibit excellent magnetic characteristics by increasing strength the of texture of a 100 surface through strict control of a content ratio of Si, Al, and the like, and performing a final annealing heat treatment in an inert gas atmosphere.

As a result, the non-oriented electrical steel sheet and the manufacturing method therefore according to the first embodiment of the present invention have an iron loss of 2.3 W/kg or less and a magnetic flux density of 1.79 to 1.90 T.

To this end, the non-oriented electrical steel sheet and the manufacturing method therefore according to the first embodiment of the present invention include C at 0.05 wt % or less, Si at 1.0 to 3.5 wt %, Al at 0.2 to 0.6 wt %, Mn at 0.02 to 0.20 wt %, P at 0.01 to 0.20 wt %, S at 0.01 wt % or less, 0 at 0.05 wt % or less, and Fe and unavoidable impurities at the remaining wt %.

In addition, the non-oriented electrical steel sheet and the manufacturing method therefore according to the first embodiment of the present invention have a thickness of 0.05 to 0.35 mm.

In addition, in the non-oriented electrical steel sheet and the manufacturing method therefore according to the first embodiment of the present invention, an atomic concentration measured within 10 μm from a surface satisfies the following Equation 1.

$$([P_{123}]+[S_{153}])/([Fe_{705}]+[O_{510}]+[C_{275}])\times 100\leq 5 \quad \text{[Equation 1]}$$

Here, [ ] denotes the content ratio of each component.

Meanwhile, a non-oriented electrical steel sheet and a manufacturing method therefore according to a second embodiment of the present invention suppressed formation of texture of a 111 surface and developed the texture of a 100 surface by controlling a reduction ratio to 55% or less in a cold rolling process in order to meet high-efficiency characteristics required by motors or transformers.

Accordingly, the non-oriented electrical steel sheet and a manufacturing method therefore according to the second embodiment of the present invention ensured excellent magnetic characteristics by suppressing formation of the texture of a 111 surface and increasing strength of the texture of a 100 surface through control of a reduction ratio in a cold rolling process.

In addition, the non-oriented electrical steel sheet and a manufacturing method therefore according to the second embodiment of the present invention ensured excellent magnetic characteristics by increasing strength of the texture of the 100 surface through strict control of a content ratio of Si, Al and the like, control of a reduction ratio in a cold rolling process and also performing a final annealing heat treatment in an inert gas atmosphere.

As a result, the non-oriented electrical steel sheet and the manufacturing method therefore according to the second embodiment of the present invention have an iron loss of 2.0 to 2.3 W/kg and a magnetic flux density of 1.75 to 1.90 T.

To this end, the non-oriented electrical steel sheet and a manufacturing method therefore according to the second embodiment of the present invention include C at 0.05 wt % or less, Si at 1.0 to 3.1 wt %, Al at 0.2 to 0.6 wt %, Mn at 0.02 to 0.20 wt %, P at 0.01 to 0.20 wt %, and Fe and unavoidable impurities at the remaining wt %.

Further, the non-oriented electrical steel sheet and the manufacturing method therefore according to the second embodiment of the present invention may further include one or more of Cu at 0.03 wt % or less, Ni at 0.03 wt % or less, Cr at 0.05 wt % or less, and S at 0.01 wt % or less.

Advantageous Effects

A non-oriented electrical steel sheet and a manufacturing method therefore according to the present invention can ensure excellent magnetic characteristics by increasing the strength of the texture of a 100 surface through strict control of the content ratio of Si, Al, and the like, and performing the final annealing heat treatment in an inert gas atmosphere.

Further, the non-oriented electrical steel sheet and the manufacturing method therefore according to the present invention can have an iron loss of 2.3 W/kg or less and a magnetic flux density of 1.79 to 1.90 T by improving the texture of the 100 surface having excellent magnetic characteristics.

Further, the non-oriented electrical steel sheet and the manufacturing method therefore according to the present invention are suitable for use as an iron core for linear compressor motors, air conditioner compressor motors, and high-speed motors for vacuum cleaners by improving the texture of the 100 surface having excellent magnetic characteristics to ensure excellent magnetic characteristics.

Further, the non-oriented electrical steel sheet and the manufacturing method therefore according to the present invention can ensure excellent magnetic characteristics by increasing strength of the texture of a 100 surface through strict control of a content ratio of Si, Al and the like, control of a reduction ratio in a cold rolling process, and performing a final annealing heat treatment in an inert gas atmosphere.

In addition, the non-oriented electrical steel sheet and the manufacturing method therefore according to the present invention can have an iron loss of 0 to 2.3 W/kg and a magnetic flux density of 1.75 to 1.90 T by suppressing the formation of the texture of the 111 surface through control of the reduction ratio to 55% or less in the cold rolling process and improving the texture of the 100 surface with excellent magnetic characteristics.

In addition, the non-oriented electrical steel sheet and the manufacturing method therefore according to the present invention are suitable for use as an iron core for linear compressor motors, air conditioner compressor motors, and high-speed motors for vacuum cleaners by improving the texture of the 100 surface with excellent magnetic characteristics to ensure excellent magnetic characteristics.

In addition to the above-described effects, the specific effects of the present invention will be described together while describing specific details for implementing the invention below.

MODES OF THE INVENTION

Figure 1:
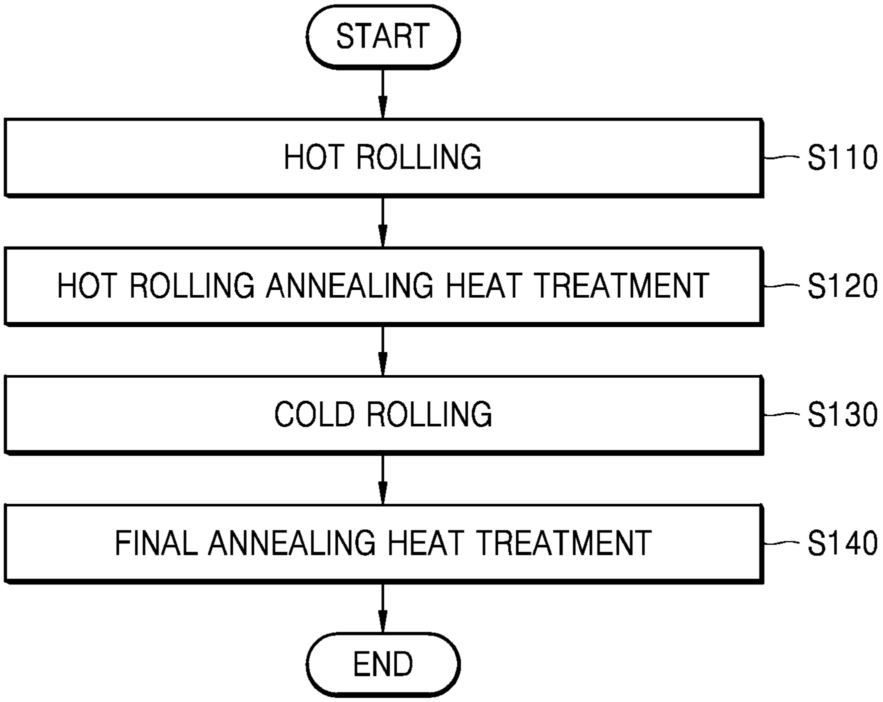
FIG. 1 is a process flow chart showing a method for manufacturing an oriented electrical steel sheet according to a first embodiment of the present invention.

The above-described objects, features and advantages will be described bellow in detail with reference to the accompanying drawings, and thus those skilled in the art to which the present invention pertains will be able to easily implement the technical idea of the present invention. In describing the present invention, when it is determined that a detailed description of a known technology related to the present invention may unnecessarily obscure the gist of the present invention, the detailed description thereof will be omitted. Hereinafter, exemplary embodiments according to the present invention will be described in detail with reference to the accompanying drawings. In the drawings, the same reference numerals are used to indicate the same or similar components.

The singular expression used herein includes the plural expression unless the context clearly indicates otherwise. In the present application, terms such as "including" or "comprising" should not be construed as necessarily including all of the various components or various steps described in the specification, may not include some of components or steps, and should be construed as being able to further include additional components or steps.

Hereinafter, a non-oriented electrical steel sheet and a manufacturing method thereof according to some embodiments of the present invention will be described.

First Embodiment

A non-oriented electrical steel sheet according to a first embodiment of the present invention is used as a core material of a motor or transformer and plays an important role in determining energy efficiency of the motor or transformer.

In such a non-oriented electrical steel sheet, in order to improve magnetic characteristics for lowering iron loss and increasing magnetic flux density, it is essential to control texture, it is preferable that many textures of a 100 surface which is easily magnetized are generated, and it is preferable that texture of a 111 surface has low strength.

In such a non-oriented electrical steel sheet, when electrical resistance of the electrical steel sheet is increased by increasing the content of Si, Al, and the like, the iron loss due to eddy current loss is reduced and the magnetic characteristics are improved, but the magnetic flux density is lowered, and thus torque of the motor is lowered or copper loss is increased.

In order to solve these problems, the non-oriented electrical steel sheet according to the first embodiment of the present invention ensured magnetic characteristics that meet high-efficiency characteristics required for motors and transformers by increasing strength of the texture of a 100 surface through performing a final annealing heat treatment in an inert gas atmosphere.

In addition, in the present invention, a non-oriented electrical steel sheet with excellent magnetic characteristics was manufactured by increasing the strength of the texture of the 100 surface through strict control of a content ratio of Si, Al, and the like and performing a final annealing heat treatment in an inert gas atmosphere.

As a result, the non-oriented electrical steel sheet according to the first embodiment of the present invention has an iron loss of 2.3 W/kg or less and more preferably 2.0 to 2.2 W/kg.

Further, the non-oriented electrical steel sheet according to the first embodiment of the present invention has a magnetic flux density of 1.79 to 1.90 T.

To this end, the non-oriented electrical steel sheet according to the first embodiment of the present invention includes C at 0.05 wt % or less, Si at 1.0 to 3.5 wt %, Al at 0.2 to 0.6 wt %, Mn at 0.02 to 0.20 wt %, P at 0.01 to 0.20 wt %, S at 0.01 wt % or less, 0 at 0.05 wt % or less, and Fe and unavoidable impurities at the remaining wt %.

Here, the non-oriented electrical steel sheet according to the first embodiment of the present invention preferably has a thickness of 0.05 to 0.35 mm. When the thickness of the non-oriented electrical steel sheet is less than 0.05 mm, it is not preferable because it may cause shape defects when the non-oriented electrical steel sheet is used as an iron core for a linear compressor motor, an air conditioner compressor motor, or a high-speed motor for a vacuum cleaner. On the other hand, when the thickness of the non-oriented electrical steel sheet exceeds 0.35 mm, it is not preferable because a large amount of the texture of the 100 surface cannot be ensured, and the magnetic flux density deteriorates.

In addition, in the non-oriented electrical steel sheet according to the first embodiment of the present invention, an atomic concentration measured within 10 μm from the surface satisfies Equation 1 below.

$$([P_{123}]+[S_{153}])/([Fe_{705}]+[O_{510}]+[C_{275}])\times 100 \leq 5 \quad \text{[Equation 1]}$$

Here, [ ] denotes a content ratio of each component. In addition, numbers in [ ] denote electron energies for each element constituting a material surface in a surface analysis by auger electron spectroscopy and indicate unique values of P of 123 eV, S of 153 eV, Fe of 705 eV, O of 510 eV, and C of 275 eV.

When conditions of Equation 1 above were satisfied, it was confirmed that the strength of the texture of the 100 surface which had excellent magnetic characteristics was strengthened, and the magnetic flux density and iron loss characteristics were improved.

Hereinafter, the role and content of each of components included in the non-oriented electrical steel sheet according to the first embodiment of the present invention will be described as follows.

Carbon (C)

When a large amount of carbon (C) is added, an austenite region is enlarged, a phase transformation section is increased, and crystal grain growth of ferrite is suppressed during a final annealing heat treatment to deteriorate iron loss. Further, since carbon (C) increases iron loss due to magnetic aging when used after a final product is processed to be an electrical product, it is preferable to limit carbon (C) to a content ratio of 0.05 wt % or less.

Silicon (Si)

Silicon (Si) is added to increase specific resistance and to lower eddy current loss in the iron loss.

Silicon (Si) is preferably added in a content ratio of 1.0 to 3.5 wt % of the total weight of the non-oriented electrical steel sheet according to the present invention, and 1.5 to 2.5 wt % may be presented as a more preferable range. When a small amount of silicon (Si) is added in a content of less than 1.0 wt %, it is difficult to obtain low iron loss characteristics and to improve permeability in a rolling direction. In addition, when the amount of silicon (Si) is added in excess of 3.5 wt %, a decrease in magnetic flux density may be caused, the torque of the motor decreases or the copper loss increases, and cracks or plate breakage may occur due to increased brittleness during cold rolling.

Aluminum (Al)

Aluminum (Al) together with silicon (Si) contributes to lowering the iron loss of the non-oriented electrical steel sheet.

Aluminum (Al) is preferably added in a content ratio of 0.2 to 0.6 wt % of the total weight of the non-oriented electrical steel sheet according to the present invention, and 0.3 to 0.5 wt % may be presented as a more preferable range. When the addition amount of aluminum (Al) is less than 0.2 wt %, it is difficult to sufficiently exhibit effects of the addition. On the other hand, when the amount of aluminum (Al) is added in excess of 0.6 wt %, the magnetic flux density is lowered, and the torque of the motor is lowered or the copper loss is increased.

Manganese (Mn)

Manganese (Mn) lowers a solid melting temperature of precipitates during reheating and serves to prevent cracks occurring at both end portions of a material during hot rolling.

Manganese (Mn) is preferably added in a content ratio of 0.02 to 0.20 wt % of the total weight of the non-oriented electrical steel sheet according to the present invention. When the addition amount of manganese (Mn) is less than 0.02 wt %, the risk of defects due to cracks during hot rolling increases. On the other hand, when the addition amount of manganese (Mn) exceeds 0.20 wt %, a roll load increases and cold rolling properties are degraded, which is not preferable.

Phosphorus (P)

Phosphorus (P) serves to increase the specific resistance and to lower the iron loss.

Phosphorus (P) is preferably added in a content ratio of 0.01 to 0.20 wt % of the total weight of the non-oriented electrical steel sheet according to the present invention. When the addition amount of phosphorus (P) is less than 0.01 wt %, there is a problem in that crystal grains are excessively increased and magnetic deviation increases. On the other hand, when the amount of phosphorus (P) is added in excess of 0.20 wt %, it is not preferable because cold rolling properties may be degraded.

Sulfur (S)

Sulfur (S) tends to react with manganese (Mn) to form MnS which is a fine precipitate, crystal grain growth is suppressed, and thus it is preferable to limit sulfur (S) to the smallest possible amount. Therefore, sulfur (S) is preferably limited to 0.01 wt % or less of the total weight of the non-oriented electrical steel sheet according to the present invention.

Oxygen (O)

When oxygen (O) is added in a large amount exceeding 0.05 wt %, an amount of oxide increases to inhibit the crystal grain growth, and thus iron loss characteristics are degraded. Therefore, oxygen (O) is preferably limited to 0.05 wt % or less of the total weight of the non-oriented electrical steel sheet according to the present invention.

Hereinafter, a manufacturing method for the non-oriented electrical steel sheet according to the first embodiment of the present invention will be described with reference to the accompanying drawings.

FIG. 1 is a process flow chart showing a manufacturing method for an oriented electrical steel sheet according to the first embodiment of the present invention.

As shown in FIG. 1, the manufacturing method for the non-oriented electrical steel sheet according to the first embodiment of the present invention includes a hot rolling step (S110), a hot rolling annealing heat treatment step (S120), a cold rolling step (S130), and a final annealing heat treatment step (S140).

Hot Rolling

In the hot rolling step (S110), a steel slab including Cat 0.05 wt % or less, Si at 1.0 to 3.5 wt %, Al at 0.2 to 0.6 wt %, Mn at 0.02 to 0.20 wt %, P at 0.01 to 0.20 wt %, S at 0.01 wt % or less, O at 0.05 wt % or less, and Fe and unavoidable impurities at the remaining wt % is reheated and then hot-rolled.

In this step, in order to facilitate hot rolling in a process in which the steel slab having the above described composition is charged into a heating furnace and is then reheated, it is preferable to perform the reheating of the steel slab at a temperature of 1,050° C. or higher. However, when the reheating temperature of the steel slab exceeds 1,250° C., precipitates such as MnS harmful to the iron loss characteristics are re-dissolved, and fine precipitates tend to be excessively generated after hot rolling. Such fine precipitates are not preferable because the fine precipitates inhibit crystal grain growth and degrade the iron loss characteristics. Therefore, the reheating of the steel slab is preferably performed at 1,050 to 1,250° C. for 1 to 3 hours.

Also, in this step, in order to prevent excessive occurrence of an oxide layer on a hot-rolled steel sheet, a finishing hot rolling temperature is preferably in the range of 800 to 950° C.

Here, the hot-rolled steel sheet may be wound at a temperature of 650 to 800° C. so that the oxide layer is not excessively generated and the crystal grain growth is not inhibited, and then may be cooled in a coil state in air.

Hot Rolling Annealing Heat Treatment Step

In the hot rolling annealing heat treatment step (S120), the hot-rolled steel sheet is subjected to a hot rolling annealing heat treatment and then subjected to pickling.

This hot rolling annealing heat treatment is performed for the purpose of recrystallizing drawn grains in the center of the hot-rolled steel sheet and inducing uniform crystal grain distribution in a thickness direction of the steel sheet.

Preferably, the hot rolling annealing heat treatment is performed at 850 to 1,000° C. When the hot rolling annealing heat treatment temperature is less than 850° C., a uniform crystal grain distribution may not be obtained, and thus the effect of improving magnetic flux density and iron loss may be insufficient. On the other hand, when the hot rolling annealing heat treatment temperature exceeds 1,000° C., the texture of the 111 surface which is unfavorable to magnetism increases, and the magnetic flux density is degraded.

Cold Rolling Step

In the cold rolling step (S130), the pickled steel sheet is cold-rolled.

In this step, the cold rolling is finally performed to have a thickness of 0.05~0.35 mm. When the thickness of the cold-rolled steel sheet is less than 0.05 mm, it is not preferable because it may cause shape defects when used as an iron core for linear compressors, air conditioner compressors, and high-speed motors for vacuum cleaners. On the other hand, when the thickness of the cold-rolled steel sheet exceeds 0.35 mm, it is not preferable because a large amount of the texture of the 100 surface cannot be ensured and the magnetic flux density is degraded.

Final Annealing Heat Treatment Step

In the final annealing heat treatment step (S140), the cold-rolled steel sheet is subjected to a final annealing heat treatment in an inert gas atmosphere.

Here, the inert gas functions as a carrier gas. The inert gas may be selected from argon, helium, neon, nitrogen, and the like, and argon gas thereamong is preferable.

In this step, the final annealing heat treatment is performed for 1 to 10 minutes at a temperature of 950 to 1,150° C. in an Ar gas atmosphere.

When the final annealing heat treatment temperature is less than 950° C., or the final annealing heat treatment time is less than 1 minute, since P and S inside the steel sheet are not sufficiently diffused to the surface, it is difficult to properly exhibit the effect of strengthening the 100 surface. On the other hand, when the final annealing heat treatment temperature exceeds 1,150° C., or the final annealing heat treatment time exceeds 10 minutes, energy loss increases and thus it is uneconomical.

After the final annealing heat treatment, the non-oriented electrical steel sheet preferably has a thickness of 0.05 to 0.35 mm. When the thickness of the non-oriented electrical steel sheet is less than 0.05 mm, and the non-oriented electrical steel sheet is used as an iron core for linear compressors, air conditioner compressors, and high-speed motors for vacuum cleaners, it is not preferable because it may cause shape defects. On the other hand, when the thickness of the non-oriented electrical steel sheet exceeds 0.35 mm, it is not preferable because a large amount of the texture of the 100 surface cannot be ensured and the magnetic flux density is degraded.

In addition, the atomic concentration measured within 10 μm from the surface of the non-oriented electrical steel sheet satisfies Equation 1 below due to the final annealing heat treatment in an inert gas atmosphere.

$$([P_{123}]+[S_{153}])/([Fe_{705}]+[O_{510}]+[C_{275}])\times 100\leq 5 \quad \text{[Equation 1]}$$

Here, [ ] denotes the content ratio of each of the components. In addition, numbers in [ ] denote electron energies for each of elements constituting the material surface in the surface analysis by Auger Electron Spectroscopy and indicate unique values of P: 123 eV, S: 153 eV, Fe: 705 eV, O: 510 eV, and C: 275 eV.

When the conditions of Equation 1 above were satisfied, it was confirmed that the texture of the 100 surface which had excellent magnetic characteristics was strengthened, and the magnetic flux density and iron loss characteristics were improved.

As described above, the non-oriented electrical steel sheet and the manufacturing method therefore according to the first embodiment of the present invention ensured excellent magnetic characteristics by increasing the strength of the texture of the 100 surface through strict control of the content ratio of Si, Al, and the like and performing the final annealing heat treatment in an inert gas atmosphere.

As a result, the non-oriented electrical steel sheet and the manufacturing method therefore according to the first embodiment of the present invention have an iron loss of 2.3 W/kg or less, and more preferably 2.0 to 2.2 W/kg, and a magnetic flux density of 1.79 to 1.90 T.

In addition, the non-oriented electrical steel sheet and the manufacturing method therefore according to the first embodiment of the present invention are suitable for use as an iron core of a linear compressor motor, an air conditioner compressor motor, and a high-speed motor for a vacuum cleaner by improving the texture of the 100 surface with excellent magnetic characteristics and thus ensuring excellent magnetic characteristics.

Second Embodiment

A non-oriented electrical steel sheet according to a second embodiment of the present invention is used as a core material of a motor or a transformer, and plays an important role in determining the energy efficiency of the motor or transformer.

In such a non-oriented electrical steel sheet, in order to improve magnetic characteristics for lowering iron loss and increasing magnetic flux density, it is essential to control texture, it is preferable that many textures of a 100 surface which is easily magnetized are generated, and it is preferable that texture of a 111 surface has low strength.

As the non-oriented electrical steel sheet becomes thinner, the iron loss due to the eddy current loss is reduced, and the magnetic characteristics are improved. However, when the reduction ratio is high in the cold rolling process, a y-fiber texture of the 111 surface is strongly developed, and a fraction occupied by the texture of the 100 surface, which is easy to magnetize, in the whole is reduced, and the magnetic characteristics are degraded.

In order to solve this problem, the non-oriented electrical steel sheet according to the second embodiment of the present invention suppressed the formation of the texture of the 111 surface and developed the texture of the 100 surface by controlling the reduction ratio to 55% or less in the cold rolling process in order to meet the high-efficiency characteristics required for motors and transformers.

Accordingly, the non-oriented electrical steel sheet according to the second embodiment of the present invention ensured excellent magnetic characteristics by suppressing the formation of the texture of the 111 surface and increasing the strength of the texture of the 100 surface through control of the reduction ratio in the cold rolling process.

Furthermore, in the present invention, a non-oriented electrical steel sheet with excellent magnetic characteristics was manufactured by increasing the strength of the texture of the 100 surface through strict control of the content ratio of Si, Al, and the like, control of the reduction ratio in the cold rolling process, and performing the final annealing heat treatment in an inert gas atmosphere.

As a result, the non-oriented electrical steel sheet according to the second embodiment of the present invention has an iron loss of 2.0 to 2.3 W/kg and a magnetic flux density of 1.75 to 1.90 T.

To this end, the non-oriented electrical steel sheet according to the second embodiment of the present invention includes C at 0.05 wt % or less, Si at 1.0 to 3.1 wt %, Al at 0.2 to 0.6 wt %, Mn at 0.02 to 0.20 wt %, P at 0.01 to 0.20 wt %, and Fe and unavoidable impurities at the remaining wt %.

In addition, the non-oriented electrical steel sheet according to the second embodiment of the present invention may further include one or more of Cu at 0.03 wt % or less, Ni at 0.03 wt % or less, Cr at 0.05 wt % or less, and S at 0.01 wt % or less.

Here, the non-oriented electrical steel sheet according to the second embodiment of the present invention preferably has a thickness of 0.05 to 0.35 mm. When the thickness of the non-oriented electrical steel sheet is less than 0.05 mm, and the non-oriented electrical steel sheet is used as an iron core for a linear compressor motor, an air conditioner compressor motor, or a high-speed motor for a vacuum cleaner, it is not preferable because it may cause shape defects. On the other hand, when the thickness of the non-oriented electrical steel sheet exceeds 0.35 mm, it is not preferable because a large amount of the texture of the 100 surface cannot be ensured and the magnetic flux density is degraded.

Hereinafter, the role and content of each of the components included in the non-oriented electrical steel sheet according to the second embodiment of the present invention will be described as follows.

Carbon (C)

When a large amount of carbon (C) is added, an austenite region is enlarged, a phase transformation section is increased, and crystal grain growth of ferrite is suppressed during a final annealing heat treatment to deteriorate iron loss. Further, since carbon (C) increases iron loss due to magnetic aging when used after a final product is processed to be an electrical product, it is preferable to limit carbon (C) to a content ratio of 0.05 wt % or less.

Silicon (Si)

Silicon (Si) is added to increase specific resistance and to lower eddy current loss in the iron loss.

Silicon (Si) is preferably added in a content ratio of 1.0 to 3.5 wt % of the total weight of the non-oriented electrical steel sheet according to the present invention, and 1.5 to 2.5 wt % may be presented as a more preferable range. When a small amount of silicon (Si) is added of less than 1.0 wt %, it is difficult to obtain low iron loss characteristics and to improve permeability in a rolling direction. In addition, when the amount of silicon (Si) is added in excess of 3.5 wt %, a decrease in magnetic flux density may be caused, the torque of the motor decreases or the copper loss increases, and cracks or plate breakage may occur due to increased brittleness during cold rolling.

Aluminum (Al)

Aluminum (Al) together with silicon (Si) contributes to lowering the iron loss of the non-oriented electrical steel sheet.

Aluminum (Al) is preferably added in a content ratio of 0.2 to 0.6 wt % of the total weight of the non-oriented electrical steel sheet according to the present invention, and 0.3 to 0.5 wt % may be presented as a more preferable range. When the addition amount of aluminum (Al) is less than 0.2 wt %, it is difficult to sufficiently exhibit effects of the addition. On the other hand, when the amount of aluminum (Al) is added in excess of 0.6 wt %, the magnetic flux density is lowered, and the torque of the motor is lowered or the copper loss is increased.

Manganese (Mn)

Manganese (Mn) lowers a solid melting temperature of precipitates during reheating and serves to prevent cracks occurring at both end portions of a material during hot rolling.

Manganese (Mn) is preferably added in a content ratio of 0.02 to 0.20 wt % of the total weight of the non-oriented electrical steel sheet according to the present invention. When the addition amount of manganese (Mn) is less than 0.02 wt %, the risk of defects due to cracks during hot rolling increases. On the other hand, when the addition amount of manganese (Mn) exceeds 0.20 wt %, a roll load increases and cold rolling properties are degraded, which is not preferable.

Phosphorus (P)

Phosphorus (P) serves to increase the specific resistance and to lower the iron loss.

Phosphorus (P) is preferably added in a content ratio of 0.01 to 0.20 wt % of the total weight of the non-oriented electrical steel sheet according to the present invention. When the addition amount of phosphorus (P) is less than 0.01 wt %, there is a problem in that crystal grains are excessively increased and magnetic deviation increases. On the other hand, when the amount of phosphorus (P) is added in excess of 0.20 wt %, it is not preferable because cold rolling properties may be degraded.

Copper (Cu)

Copper (Cu) is added because it improves the texture, suppresses fine CuS precipitation, and resists oxidation and corrosion. However, when a large amount of copper (Cu) is added in excess of 0.03 wt %, it may cause uniformity on the surface of the steel sheet, which is not preferable. Therefore, copper (Cu) is preferably limited to a content ratio of 0.03 wt % or less of the total weight of the non-oriented electrical steel sheet according to the present invention.

Nickel (Ni)

Nickel (Ni) improves the texture and is added together with Cu to suppress the precipitation of S as fine CuS and is added because it resists oxidation and corrosion. However, when the addition amount of nickel (Ni) exceeds 0.03 wt %, the effect of improving the texture is insignificant despite the large amount of nickel (Ni) added, which is not preferable because it is uneconomical. Therefore, nickel (Ni) is preferably limited to a content ratio of 0.03 wt % or less of the total weight of the non-oriented electrical steel sheet according to the present invention.

Chromium (Cr)

Chromium (Cr) serves to improve the iron loss by increasing the specific resistance, but does not increase the strength of the material. However, when a large amount of chromium (Cr) is added in excess of 0.05 wt %, there is a problem in that the magnetic flux density is reduced by promoting development of the texture unfavorable to magnetism. Therefore, preferably, the chromium (Cr) is strictly limited to a content ratio of 0.05 wt % or less of the total weight of the non-oriented electrical steel sheet according to the present invention.

Sulfur (S)

Sulfur (S) tends to react with manganese (Mn) to form MnS which is a fine precipitate, crystal grain growth is suppressed, and thus it is preferable to limit sulfur (S) to have the smallest possible amount. Therefore, sulfur (S) is preferably limited to 0.01 wt % or less of the total weight of the non-oriented electrical steel sheet according to the present invention.

Hereinafter, a manufacturing method for the non-oriented electrical steel sheet according to the second embodiment of the present invention will be described with reference to the accompanying drawings.

Figure 2:
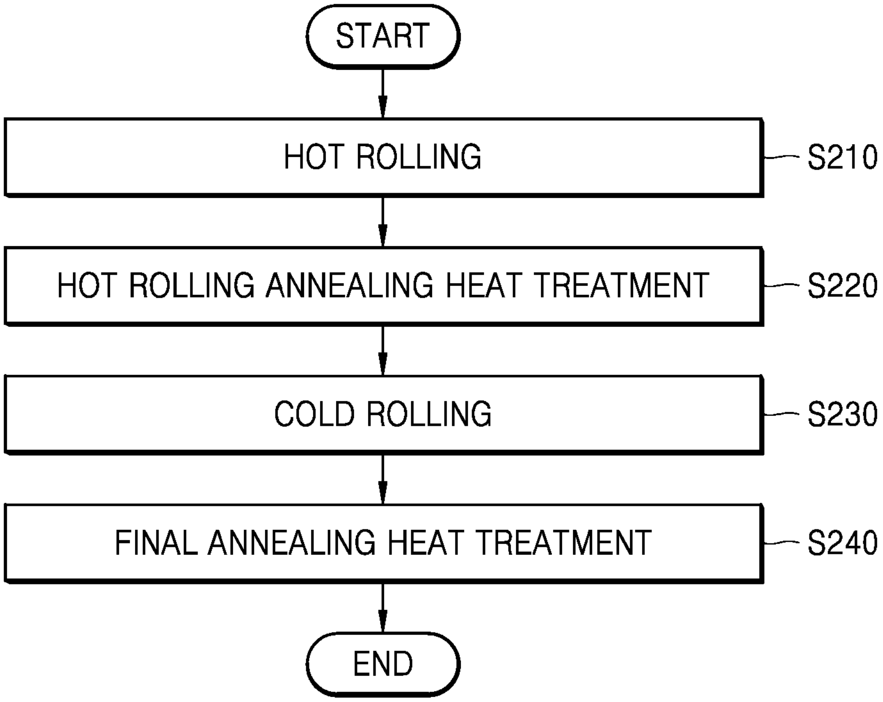
FIG. 2 is a process flow chart showing a method for manufacturing an oriented electrical steel sheet according to a second embodiment of the present invention.

FIG. 2 is a process flow chart showing a manufacturing method for an oriented electrical steel sheet according to a second embodiment of the present invention.

As shown in FIG. 2, the manufacturing method for the non-oriented electrical steel sheet according to the first embodiment of the present invention includes a hot rolling step (S210), a hot rolling annealing heat treatment step (S220), a cold rolling step (S230), and a final annealing heat treatment step (S240).

Hot Rolling

In the hot rolling step (S210), a steel slab containing C at 0.05 wt % or less, Si at 1.0 to 3.1 wt %, Al at 0.2 to 0.6 wt %, Mn at 0.02 to 0.20 wt %, P at 0.01 to 0.20 wt %, Fe and unavoidable impurities at the remaining wt % is reheated and then hot-rolled.

In this step, in order to facilitate hot rolling in a process in which the steel slab having the above described composition is charged into a heating furnace and is then reheated, it is preferable to perform the reheating of the steel slab at a temperature of 1,050° C. or higher. However, when the reheating temperature of the steel slab exceeds 1,250° C., precipitates such as MnS harmful to the iron loss characteristics are re-dissolved, and fine precipitates tend to be excessively generated after hot rolling. Such fine precipitates are not preferable because the fine precipitates inhibit crystal grain growth and degrade the iron loss characteristics. Therefore, the reheating of the steel slab is preferably performed at 1,050 to 1,250° C. for 1 to 3 hours.

Also, in this step, in order to prevent excessive occurrence of an oxide layer on a hot-rolled steel sheet, a finishing hot rolling temperature is preferably 800 to 950° C.

Here, the hot-rolled steel sheet may be wound at a temperature of 650 to 800° C. so that the oxide layer is not excessively generated and the crystal grain growth is not inhibited, and then may be cooled in a coil state in air.

Hot Rolling Annealing Heat Treatment Step

In the hot rolling annealing heat treatment step (S220), the hot-rolled steel sheet is subjected to a hot rolling annealing heat treatment and then subjected to pickling.

This hot rolling annealing heat treatment is performed for the purpose of recrystallizing drawn grains in the center of the hot-rolled steel sheet and inducing uniform crystal grain distribution in a thickness direction of the steel sheet.

Preferably, the hot rolling annealing heat treatment is performed at 850 to 1,000° C. When the hot rolling annealing heat treatment temperature is less than 850° C., the uniform crystal grain distribution may not be obtained, and thus the effect of improving magnetic flux density and iron loss may be insufficient. On the other hand, when the hot rolling annealing heat treatment temperature exceeds 1,000° C., the texture of the 111 surface which is unfavorable to magnetism increases, and the magnetic flux density is degraded.

Cold Rolling Step

In the cold rolling step (S230), the pickled steel sheet is cold rolled at a reduction ratio of 55% or less.

In this step, the cold rolling is finally performed to have a thickness of 0.05~0.35 mm. When the thickness of the cold-rolled steel sheet is less than 0.05 mm, it is not preferable because it may cause shape defects when used as an iron core for linear compressors, air conditioner compressors, and high-speed motors for vacuum cleaners. On the other hand, when the thickness of the cold-rolled steel sheet exceeds 0.35 mm, it is not preferable because a large amount of the texture of the 100 surface cannot be ensured and the magnetic flux density is degraded.

In this step, cold rolling is preferably performed at a reduction ratio of 55% or less, and more preferably 45 to 49%. When the reduction ratio in the cold rolling exceeds 55%, there is a problem in that the texture of the 111 surface is strongly developed and the fraction of the texture of the 100 surface with excellent magnetic characteristics is reduced.

Therefore, in order to improve the magnetic characteristics by suppressing the generation of the texture of the 111 surface and increasing the generation of the texture of the 100 surface, it is preferable to strictly limit the reduction ratio in the cold rolling process to 55% or less and more preferably 45 to 49%.

Here, the reduction ratio in the cold rolling corresponds to (initial steel sheet thickness−final steel sheet thickness)/(initial steel sheet thickness)×100. Here, the initial steel sheet is the hot-rolled steel sheet, and the final steel sheet is the cold-rolled steel sheet.

Final Annealing Heat Treatment Step

In the final annealing heat treatment step (S240), the cold-rolled steel sheet is subjected to a final annealing heat treatment in an inert gas atmosphere.

Here, the inert gas functions as a carrier gas. The inert gas may be selected from argon, helium, neon, nitrogen, and the like, and argon gas thereamong is preferable.

In this step, the final annealing heat treatment is performed for 1 to 10 minutes at a temperature of 950 to 1,150° C. in an Ar gas atmosphere.

When the final annealing heat treatment temperature is less than 950° C., or the final annealing heat treatment time is less than 1 minute, since P and S inside the steel sheet are not sufficiently diffused to the surface, it is difficult to properly exhibit the effect of strengthening the 100 surface. On the other hand, when the final annealing heat treatment temperature exceeds 1,150° C., or the final annealing heat treatment time exceeds 10 minutes, energy loss increases and thus it is uneconomical.

After the final annealing heat treatment, the non-oriented electrical steel sheet preferably has a thickness of 0.05 to 0.35 mm. When the thickness of the non-oriented electrical steel sheet is less than 0.05 mm, and the non-oriented electrical steel sheet is used as an iron core for linear compressors, air conditioner compressors, and high-speed motors for vacuum cleaners, it is not preferable because it may cause shape defects. On the other hand, when the thickness of the non-oriented electrical steel sheet exceeds 0.35 mm, it is not preferable because a large amount of the texture of the 100 surface cannot be ensured and the magnetic flux density is degraded.

As described above, the non-oriented electrical steel sheet and the manufacturing method therefore according to the second embodiment of the present invention ensured excellent magnetic characteristics by increasing the strength of the texture of the 100 surface through strict control of the content ratio of Si, Al, and the like, strict control of the reduction ratio in the cold rolling process and performing the final annealing heat treatment in an inert gas atmosphere.

In this way, the non-oriented electrical steel sheet and the manufacturing method therefore according to the second embodiment of the present invention suppressed the formation of the texture of the 111 surface and developed the texture of the 100 surface by limiting the reduction ratio to 55% or less in the cold rolling process in order to meet the high-efficiency characteristics required for motors and transformers.

Therefore, the non-oriented electrical steel sheet and the manufacturing method therefore according to the second embodiment of the present invention ensured excellent magnetic characteristics by suppressing the formation of the texture of the 111 surface and increasing the strength of the texture of the 100 surface through control of the reduction ratio in the cold rolling process.

As a result, the non-oriented electrical steel sheet and the manufacturing method therefore according to the second embodiment of the present invention have an iron loss of 2.0 to 2.3 W/kg and a magnetic flux density of 1.75 to 1.90 T.

In addition, the non-oriented electrical steel sheet and the manufacturing method therefore according to the second embodiment of the present invention are suitable for use as an iron core of a linear compressor motor, an air conditioner compressor motor, and a high-speed motor for a vacuum cleaner by improving the texture of the 100 surface with excellent magnetic characteristics and ensuring excellent magnetic characteristics.

EXAMPLES

Hereinafter, the configuration and operation of the present invention will be described in more detail through exemplary embodiments of the present invention. However, these are presented as exemplary examples of the present invention and cannot be construed as limiting the present invention in any sense.

Since the contents not described herein can be technically inferred sufficiently by those skilled in the art, the description thereof will be omitted.

1. Manufacture of Non-Oriented Electrical Steel Sheet

Non-oriented electrical steel sheets according to Examples 1 to 4 and Comparative Examples 1 to 3 were manufactured under compositions shown in Table 1 and process conditions shown in Table 2.

TABLE 1

(unit: wt %)

| Classification | C | Si | Al | Mn | P | S | 0 | Fe |
|---|---|---|---|---|---|---|---|---|
| Example 1 | 0.020 | 2.15 | 0.45 | 0.13 | 0.028 | 0.002 | 0.022 | Bal. |
| Example 2 | 0.020 | 2.24 | 0.47 | 0.11 | 0.028 | 0.002 | 0.021 | Bal. |
| Example 3 | 0.030 | 2.31 | 0.49 | 0.12 | 0.029 | 0.002 | 0.023 | Bal. |
| Example 4 | 0.010 | 2.13 | 0.50 | 0.14 | 0.027 | 0.002 | 0.022 | Bal. |
| Comparative example 1 | 0.020 | 2.15 | 0.45 | 0.15 | — | 0.002 | 0.022 | Bal. |
| Comparative example 2 | 0.034 | 2.24 | 0.50 | 0.11 | — | 0.002 | 0.021 | Bal. |
| Comparative example 3 | 0.035 | 2.35 | 0.47 | 0.12 | 0.021 | 0.002 | 0.022 | Bal. |

TABLE 2

| Classification | Reheating temperature (° C.) | Finishing hot rolling temperature (° C.) | Hot rolling annealing heat treatment temperature (° C.) | Inert gas | Final annealing heat treatment temperature (° C.) | Final annealing heat treatment time (min) |
|---|---|---|---|---|---|---|
| Example 1 | 1,150 | 860 | 920 | Ar | 970 | 8 |
| Example 2 | 1,150 | 850 | 910 | Ar | 950 | 10 |
| Example 3 | 1,150 | 830 | 900 | Ar | 960 | 7 |
| Example 4 | 1,150 | 870 | 920 | Ar | 980 | 9 |
| Comparative example 1 | 1,150 | 850 | 910 | — | 940 | 13 |
| Comparative example 2 | 1,150 | 860 | 920 | — | 930 | 14 |
| Comparative example 3 | 1,150 | 840 | 930 | — | 920 | 15 |

2. Evaluation of Magnetic Characteristics

Table 3 shows results of evaluation of the magnetic characteristics of the non-oriented electrical steel sheets according to Examples 1 to 4 and Comparative examples 1 to 3. At this time, iron loss W15/50 is an amount of energy lost consumed by heat when a magnetic flux density of 1.5 tesla is induced in an iron core at 50 Hz AC, and magnetic flux density B50 is a value induced by an excitation force of 5000 A/m.

TABLE 3

| classification | Magnetic flux density (T) B50 | Iron loss (W/Kg) W15/50 | $([P_{123}] + [S_{153}])/([Fe_{705}] + [O_{510}] + [C_{275}]) \times 100$ |
|---|---|---|---|
| Example 1 | 1.80 | 2.12 | 6.00 |
| Example 2 | 1.79 | 2.21 | — |
| Example 3 | 1.81 | 2.16 | — |
| Example 4 | 1.80 | 2.07 | — |
| Comparative example 1 | 1.67 | 3.06 | 0.41 |
| Comparative example 2 | 1.65 | 3.11 | — |
| Comparative example 3 | 1.66 | 3.23 | — |

As shown in Tables 1 to 3, it can be confirmed that the non-oriented electrical steel sheets according to Examples 1 to 4 which were subjected to the final annealing heat treatment in an Ar gas atmosphere satisfy both an iron loss of 2.3 W/kg or less and a magnetic flux density of 1.79 to 1.90 T corresponding to target values.

On the other hand, it was confirmed that all of the non-oriented electrical steel sheets according to Comparative examples 1 to 3 had the iron losses and the magnetic flux densities less than the target values. This is considered to be due to the fact that the final annealing heat treatment is not performed in an Ar gas atmosphere, and the final annealing heat treatment temperature and time are out of the range suggested by the present invention.

3. Surface Composition and Microstructure Analysis

Figure 3:
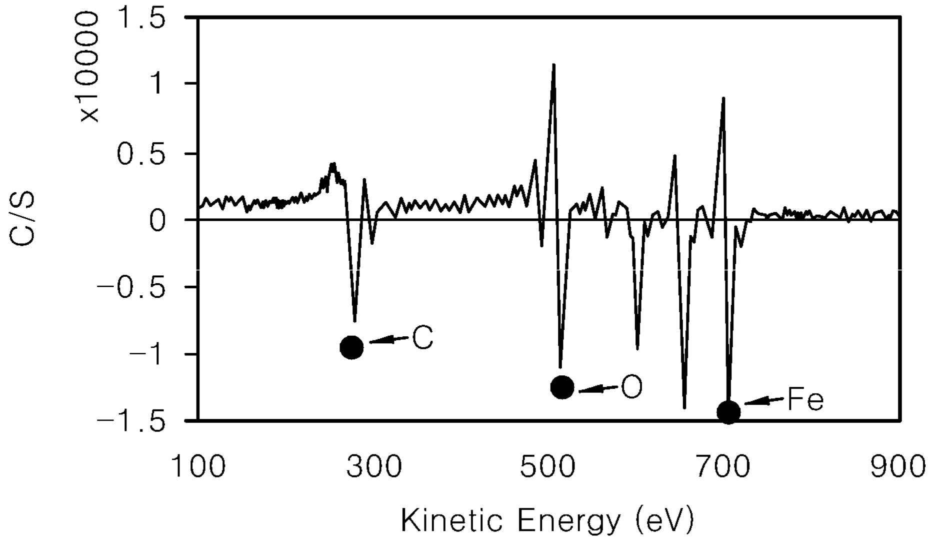
FIG. 3 is a graph showing results of analyzing surface components of an electrical steel sheet of Example 1 before a final annealing heat treatment.
Figure 4:
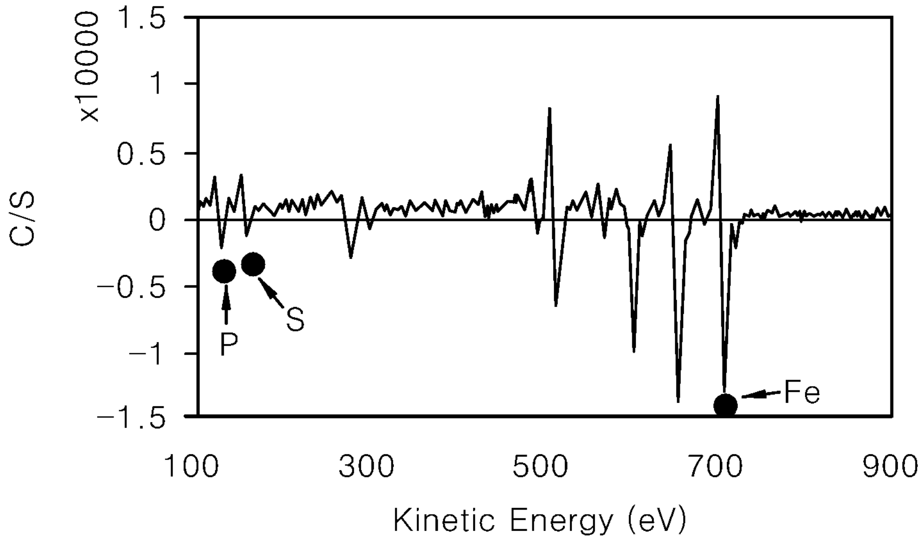
FIG. 4 is a graph showing results of analyzing the surface components of the electrical steel sheet of Example 1 after the final annealing heat treatment.

FIG. 3 is a graph showing results of analyzing the surface components of the electrical steel sheet of Example 1 before the final annealing heat treatment, and FIG. 4 is a graph showing results of analyzing the surface components of the electrical steel sheet of Example 1 after the final annealing heat treatment.

As shown in FIG. 3, the results of analyzing the surface components of the electrical steel sheet of Example 1 before the final annealing heat treatment are shown, and P and S were not observed between 120 and 160 eV.

Meanwhile, as shown in FIG. 4, the results of analyzing the surface components of the phase after the final annealing heat treatment for the electrical steel sheet of Example 1 are shown, and it can be confirmed that P was observed at 123 eV and S was observed at 153 eV.

It was confirmed through an auger electron spectroscopy (AES) surface analysis that P and S are diffused to the surface from the inside of the non-oriented electrical steel sheet according to Example 1.

As shown in Table 3, it was confirmed that the atomic concentration measured at a thickness of 7 μm from the surface obtained by surface analysis with the AES was measured as $([P_{123}]+[S_{153}])/([Fe_{705}]+[O_{510}]+[C_{275}])\times 100=6.00$, and the condition of Equation 1 was satisfied.

As a result, in the non-oriented electrical steel sheet according to Example 1, it was confirmed that the strength of the 100 surface having excellent magnetic characteristics was strengthened and thus the magnetic flux density B50 and iron loss W15/50 characteristics were improved.

On the other hand, in the non-oriented electrical steel sheet according to Comparative example 1, it was confirmed that the atomic concentration measured at a thickness of 7 μm from the surface obtained by surface analysis with the AES was $([P_{123}]+[S_{153}])/([Fe_{705}]+[O_{510}]+[C_{275}])\times 100=0.41$, and the condition of Equation 1 was not satisfied.

As a result, it was confirmed that the non-oriented electrical steel sheet according to Comparative example 1 had poor magnetic flux density B50 and iron loss W15/50 characteristics compared to Example 1.

Figure 5:
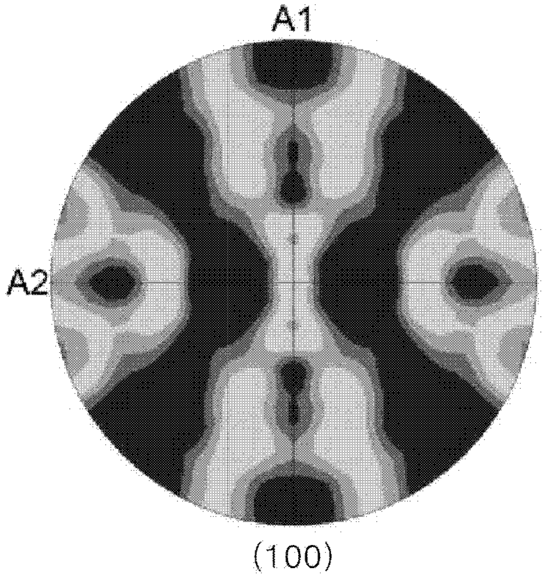
FIG. 5 is a photograph showing electron backscatter diffraction (EBSD) measurement results for an electrical steel sheet of Comparative example 1.
Figure 6:
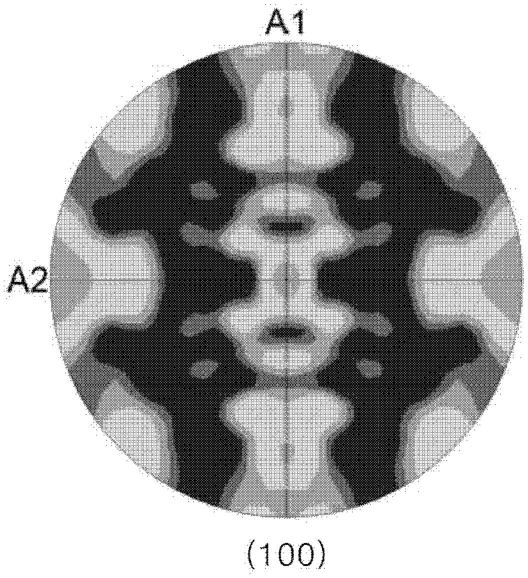
FIG. 6 is a photograph showing EBSD measurement results for an electrical steel sheet of Example 2.

FIG. 5 is a photograph showing electron backscatter diffraction (EBSD) measurement results for the electrical steel sheet of Comparative example 1, and FIG. 6 is a photograph showing EBSD measurement results for the electrical steel sheet of Example 2.

As shown in FIGS. 5 and 6, the electrical steel sheets according to Comparative examples 1 and 2 were measured by EBSD, and pole figures obtained as a result are shown.

At this time, it can be confirmed that the electrical steel sheet according to Comparative example 1 partially has the texture of the 100 surface.

On the other hand, it can be confirmed that in the electrical steel sheet according to Example 2, which was subjected to the final annealing heat treatment at 950° C. for 10 minutes in an Ar atmosphere, a large amount of texture of the 100 surface was generated.

4. Manufacture of Non-Oriented Electrical Steel Sheet

Non-oriented electrical steel sheets according to Examples 5 to 9 and Comparative examples 4 to 9 were prepared under compositions shown in Table 4 and process conditions shown in Table 2.

TABLE 4

(unit: wt %)

| classification | C | Si | Al | Mn | P | Cu (ppm) | Ni (ppm) | Cr (ppm) | S (ppm) | Fe |
|---|---|---|---|---|---|---|---|---|---|---|
| Example 5 | 0.020 | 2.01 | 0.41 | 0.13 | 0.14 | 106 | 77 | 41 | 43 | Bal. |
| Example 6 | 0.020 | 2.01 | 0.42 | 0.11 | 0.15 | 125 | 75 | 42 | 42 | Bal. |
| Example 7 | 0.030 | 2.11 | 0.45 | 0.12 | 0.11 | 116 | 74 | 41 | 40 | Bal. |
| Example 8 | 0.020 | 2.11 | 0.42 | 0.14 | 0.12 | — | 71 | 40 | 45 | Bal. |
| Example 9 | 0.020 | 2.20 | 0.43 | 0.13 | 0.14 | 156 | — | 41 | 43 | Bal. |
| Comparative example 4 | 0.020 | 2.10 | 0.41 | 0.13 | 0.11 | 106 | 74 | — | 41 | Bal. |
| Comparative example 5 | 0.020 | 2.20 | 0.42 | 0.14 | 0.14 | 124 | — | 45 | 47 | Bal. |
| Comparative example 6 | 0.030 | 2.30 | 0.43 | 0.12 | 0.15 | 116 | — | 47 | 46 | Bal. |
| Comparative example 7 | 0.030 | 2.30 | 0.45 | 0.12 | 0.15 | 154 | 73 | — | 44 | Bal. |
| Comparative example 8 | 0.030 | 2.30 | 0.46 | 0.12 | 0.15 | — | 72 | — | 41 | Bal. |
| Comparative example 9 | 0.030 | 2.30 | 0.45 | 0.13 | 0.15 | 110 | — | 45 | 42 | Bal. |

TABLE 5

| classification | Reheating temperature (° C.) | Finishing hot rolling temperature (° C.) | Hot rolling annealing heat treatment temperature (° C.) | Reduction ratio (%) | Inert gas | Final annealing heat treatment temperature (° C.) | Final annealing heat treatment time (min) |
|---|---|---|---|---|---|---|---|
| Example 5 | 1,150 | 860 | 910 | 54 | Ar | 990 | 10 |
| Example 6 | 1,150 | 870 | 920 | 50 | Ar | 980 | 8 |
| Example 7 | 1,150 | 840 | 920 | 48 | Ar | 1,000 | 9 |
| Example 8 | 1,150 | 850 | 910 | 46 | Ar | 970 | 9 |
| Example 9 | 1,150 | 860 | 910 | 45 | Ar | 980 | 10 |
| Comparative example 4 | 1,150 | 860 | 920 | 62 | Ar | 950 | 8 |
| Comparative example 5 | 1,150 | 850 | 910 | 69 | Ar | 930 | 7 |
| Comparative example 6 | 1,150 | 840 | 920 | 76 | Ar | 950 | 10 |
| Comparative example 7 | 1,150 | 860 | 930 | 74 | Ar | 970 | 9 |
| Comparative example 8 | 1,150 | 840 | 920 | 80 | Ar | 980 | 10 |
| Comparative example 9 | 1,150 | 840 | 920 | 76 | Ar | 1,050 | 10 |

5. Physical Property Evaluation

Table 6 shows evaluation results of physical properties of the non-oriented electrical steel sheets according to Examples 5 to 9 and Comparative examples 4 to 9. At this time, the iron loss W15/50 is the amount of energy lost consumed by heat or the like when a magnetic flux density of 1.5 tesla is induced in the iron core at 50 Hz AC, and the magnetic flux density B50 is a value induced by an excitation force of 5000 A/m.

TABLE 6

| classification | Magnetic flux density (T) B50 | Iron loss (W/Kg) W15/50 | Reduction ratio (%) |
|---|---|---|---|
| Example 5 | 1.77 | 2.29 | 54 |
| Example 6 | 1.79 | 2.23 | 50 |
| Example 7 | 1.82 | 2.16 | 48 |
| Example 8 | 1.85 | 2.13 | 46 |
| Example 9 | 1.87 | 2.09 | 45 |
| Comparative example 4 | 1.71 | 3.28 | 62 |
| Comparative example 5 | 1.69 | 3.33 | 69 |
| Comparative example 6 | 1.68 | 3.54 | 76 |
| Comparative example 7 | 1.69 | 3.36 | 74 |
| Comparative example 8 | 1.68 | 3.58 | 80 |
| Comparative example 9 | 1.69 | 3.51 | 76 |

As shown in Tables 4 to 6, it can be confirmed that all of the non-oriented electrical steel sheets according to Examples 5 to 9 satisfy an iron loss of 2.0 to 2.3 W/kg and a magnetic flux density of 1.75 to 1.90 T corresponding to the target values.

In particular, it was confirmed that the magnetic characteristics of the non-oriented electrical steel sheets according to Examples 7 and 8 which were implemented in a reduction ratio of 45 to 48% in the cold rolling process were most excellently measured.

On the other hand, it was confirmed that all of the non-oriented electrical steel sheets according to Comparative examples 4 to 9 had the iron losses and the magnetic flux densities less than the target values. This is considered to be due to the reduction ratio in the cold rolling process being out of the range suggested by the present invention.

6. Microstructure Analysis

Figure 7:
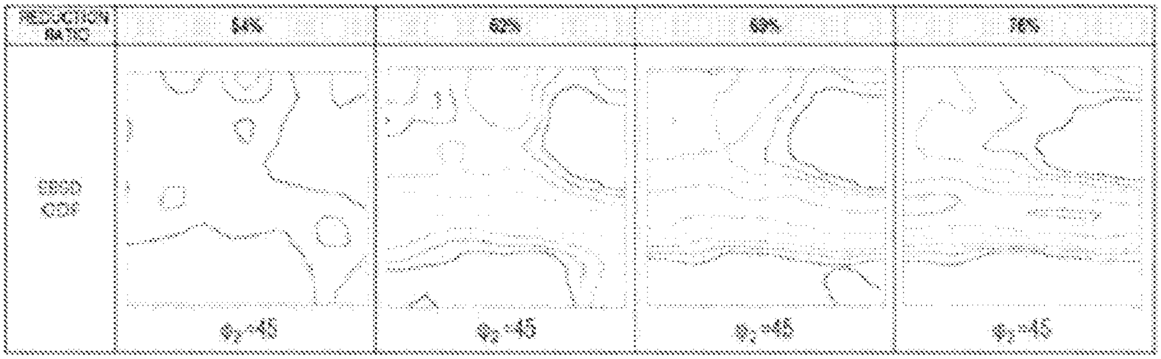
FIG. 7 is a photograph showing the EBSD measurement results for non-oriented electrical steel sheets according to Example 6 and Comparative examples 4 to 6.

FIG. 7 is a photograph showing EBSD measurement results for non-oriented electrical steel sheets according to Example 5 and Comparative examples 4 to 6.

As shown in FIG. 7, in the non-oriented electrical steel sheet according to Example 5, it was confirmed that the strength of the texture of the 111 surface was lowered compared to the electrical steel sheets according to Comparative examples 4 to 6.

That is, it was confirmed by ODF analysis through the EBSD measurement that, unlike Comparative examples 4 to 6 in which the reduction ratio in the cold rolling process was 62%, 69%, and 76%, as the reduction ratio was reduced to 54% as in Example 5, the strength of the texture of the 111 surface was decreased.

Figure 8:
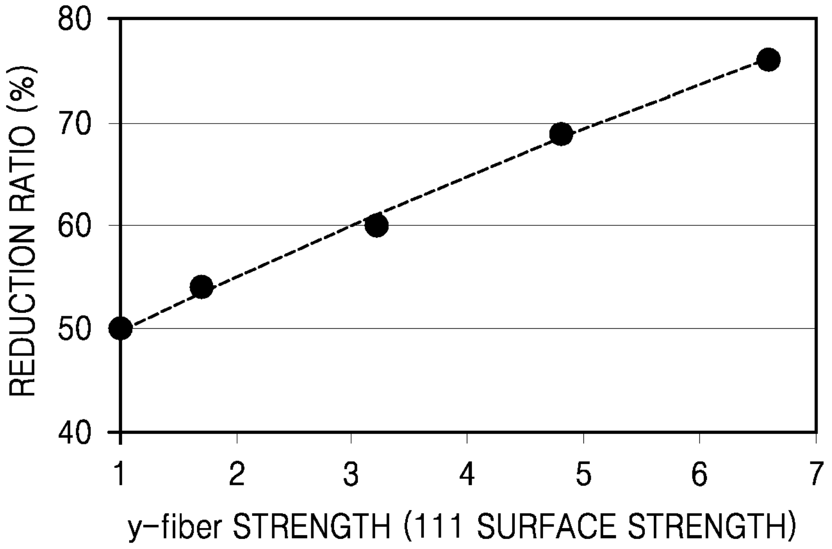
FIG. 8 is a graph showing strength measurement results of a 111 surface of each of the non-oriented electrical steel sheets according to Examples 5 and 6 and Comparative examples 4 to 6.

Further, FIG. 8 is a graph showing strength measurement results of the 111 surface of each of the non-oriented electrical steel sheets according to Examples 5 and 6 and Comparative examples 4 to 6. At this time, FIG. 8 shows the strength measurement results of the 111 surface of the non-oriented electrical steel sheet before the final annealing heat treatment.

As shown in FIG. 8, in the case of the non-oriented electrical steel sheets according to Examples 5 and 6 in which the rolling reduction in cold rolling was 54% and 50%, respectively, it can be confirmed that the strength of the texture of the 111 surface is lower than that of the non-oriented electrical steel sheets according to Comparative examples 4 to 6 in which the reduction ratio in cold rolling was 62%, 69%, and 76%, respectively.

That is, it was confirmed that the strength of the texture of the 111 surface had a tendency to increase as the reduction ratio in cold rolling was increased.

Figure 9:
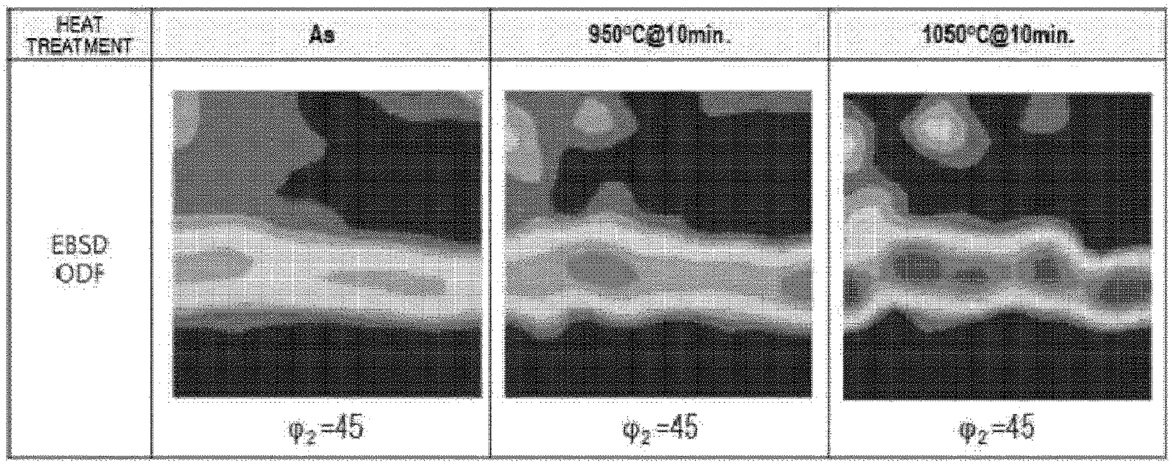
FIG. 9 is a photograph showing results of orientation distribution function (ODF) analysis through EBSD measurement of the non-oriented electrical steel sheets according to Comparative examples 6 and 9.

FIG. 9 is a photograph showing results of ODF analysis through the EBSD measurement of the non-oriented electrical steel sheets according to Comparative examples 6 and 9.

As shown in FIG. 9, in the non-oriented electrical steel sheet according to Comparative Example 6, the strength of the texture of the 111 surface was measured to be 6.6 before the final annealing heat treatment, and the strength of the texture of the 111 surface was measured to be 9.5 after the final annealing heat treatment at 950° C.

In addition, the non-oriented electrical steel sheet according to Comparative example 9 was subjected to the final annealing heat treatment at 1,050° C., and then the strength of the texture of the 111 surface was measured to be 12.

Based on the above experimental results, it can be confirmed that the strength of the texture of the 111 surface tends to increase as the heat treatment temperature increases.

As described above, the present invention has been described with reference to the illustrated drawings, but the present invention is not limited by the embodiments and drawings disclosed in the specification, and it is apparent that various modifications can be made by those skilled in the art within the scope of the technical spirit of the present invention. In addition, even when the operations and effects according to the configuration of the present invention have not been explicitly described while the embodiments of the present invention are described, it goes without saying that the predictable effects by the configuration should also be recognized.

EXPLANATION OF REFERENCE NUMERALS

S110: Hot rolling step
S120: Hot rolling annealing heat treatment step
S130: Cold rolling step
S140: Final annealing heat treatment step

The invention claimed is:

1. A non-oriented electrical steel sheet comprising:

C at 0.01 to 0.05 wt %, Si at 1.0 to 3.5 wt %, Al at 0.2 to 0.6 wt %, Mn at 0.02 to 0.20 wt %, P at 0.01 to 0.20 wt %, S at 0.01 wt % or less, O at 0.05 wt % or less, and Fe and unavoidable impurities at the remaining wt %, wherein an iron loss (W15/50) of the non-oriented electrical steel sheet is 2.3 W/kg or less, and wherein the iron loss corresponds to an amount of energy lost in a form of heat based on a magnetic flux density of 1.5 tesla being induced in an iron core including the non-oriented electrical steel sheet at 50 Hz AC.

2. The non-oriented electrical steel sheet of claim 1, wherein the electrical steel sheet has a thickness of 0.05 to 0.35 mm.

3. The non-oriented electrical steel sheet of claim 1, wherein the iron loss is 2.0 to 2.2 W/kg.

4. The non-oriented electrical steel sheet of claim 1, wherein the non-oriented electrical steel sheet has a magnetic flux density (B50) of 1.79 to 1.90 T, and wherein the magnetic flux density is a value induced by an excitation force of 5000 A/m applied to the non-oriented electrical steel sheet.

5. The non-oriented electrical steel sheet of claim 1, wherein an atomic concentration measured within 10 μm from a surface of the non-oriented electrical steel sheet satisfies Equation 1 below, $$([P_{123}]+[S_{153}])/([Fe_{705}]+[O_{510}]+[C_{275}])\times 100\leq 5 \quad \text{[Equation 1]}$$

(Here, [ ] denotes a content ratio of each component, and numbers in [ ] correspond to (i) electron energies for each of elements constituting the surface based on a surface analysis by Auger Electron Spectroscopy and (ii) values of P: 123 eV, S: 153 eV, Fe: 705 eV, O: 510 eV, and C: 275 eV).

6. A non-oriented electrical steel sheet comprising:

C at 0.02 to 0.05 wt %, Si at 1.0 to 3.1 wt %, Al at 0.2 to 0.6 wt %, Mn at 0.02 to 0.20 wt %, P at 0.01 to 0.20 wt %, and Fe and unavoidable impurities at the remaining wt %, wherein a magnetic flux density (B50) of the non-oriented electrical steel sheet is 1.75 to 1.90 T, wherein the magnetic flux density is a value induced by an excitation force of 5000 A/m applied to the non-oriented electrical steel sheet, wherein the non-oriented electrical steel sheet has an iron loss (W15/50) of 2.0 to 2.3 W/Kg, and wherein the iron loss corresponds to an amount of energy lost in a form of heat based on a magnetic flux density of 1.5 tesla being induced in an iron core including the non-oriented electrical steel sheet at 50 Hz AC.

7. The non-oriented electrical steel sheet of claim 6, further comprising one or more of Cu at 0.03 wt % or less, Ni at 0.03 wt % or less, Cr at 0.05 wt % or less, and S at 0.01 wt % or less.

8. The non-oriented electrical steel sheet of claim 6, wherein the electrical steel sheet has a thickness of 0.05 to 0.35 mm.

9. A method for manufacturing the non-oriented electrical steel sheet of claim 1 comprising:

a step (a) of reheating and then hot-rolling a steel slab containing C at 0.05 wt % or less, Si at 1.0 to 3.5 wt %, Al at 0.2 to 0.6 wt %, Mn at 0.02 to 0.20 wt %, P at 0.01 to 0.20 wt %, S at 0.01 wt % or less, O at 0.05 wt % or less, and Fe and unavoidable impurities at the remaining wt %;

a step (b) of performing a hot rolling annealing heat treatment of a hot-rolled steel sheet and performing pickling;

a step (c) of cold-rolling a pickled steel sheet; and a step (d) of performing a final annealing heat treatment of the cold-rolled steel sheet in an inert gas atmosphere.

10. The method of claim 9, wherein, after the step (c), the electrical steel sheet has a thickness of 0.05 to 0.35 mm.

11. The method of claim 9, wherein, in the step (d), the final annealing heat treatment is performed for 1 to 10 minutes at a temperature of 950 to 1,150° C. in an Ar gas atmosphere.

12. The method of claim 9, wherein, after the step (d), in the electrical steel sheet, an atomic concentration measured within 10 μm from a surface satisfies Equation 1 below, $$([P_{123}]+[S_{153}])/([Fe_{705}]+[O_{510}]+[C_{275}])\times 100\leq 5 \quad \text{[Equation 1]}$$

(Here, [ ] denotes a content ratio of each component, and numbers in [ ] correspond to (i) electron energies for each of elements constituting the surface based on a surface analysis by Auger Electron Spectroscopy and (ii) values of P: 123 eV, S: 153 eV, Fe: 705 eV, O: 510 eV, and C: 275 eV).

13. The method of claim 9, wherein, after step (d), the electrical steel sheet has an iron loss of 2.0 to 2.3 W/kg and a magnetic flux density of 1.79 to 1.90 T.

14. A method for manufacturing the non-oriented electrical steel sheet of claim 6 comprising:

a step (a) of reheating and then hot-rolling a steel slab containing C at 0.05 wt % or less, Si at 1.0 to 3.1 wt %, Al at 0.2 to 0.6 wt %, Mn at 0.02 to 0.20 wt %, P at 0.01 to 0.20 wt %, and Fe and unavoidable impurities at the remaining wt %;

a step (b) of performing a hot rolling annealing heat treatment of a hot-rolled steel sheet and performing pickling;

a step (c) of cold-rolling a pickled steel sheet in a reduction ratio of 55% or less; and a step (d) of performing a final annealing heat treatment of a cold-rolled steel sheet in an inert gas atmosphere.

15. The method of claim 14, wherein the steel slab further includes one or more of Cu at 0.03 wt % or less, Ni at 0.03 wt % or less, Cr at 0.05 wt % or less, and S at 0.01 wt % or less.

16. The method of claim 14, wherein, in the step (c), the cold rolling is performed in a reduction ratio of 45 to 49%.

17. The method of claim 14, wherein, after the step (c), the electrical steel sheet has a thickness of 0.05 to 0.35 mm.

18. The method of claim 14, wherein, in the step (d), the final annealing heat treatment is performed for 1 to 10 minutes at a temperature of 950 to 1,150° C. in an Ar gas atmosphere.

19. The method of claim 14, wherein, after the step (d), the electrical steel sheet has an iron loss of 2.0 to 2.3 W/kg and a magnetic flux density of 1.79 to 1.90 T.

* * * * *